(12) United States Patent
Rofougaran et al.

(10) Patent No.: US 7,973,702 B2
(45) Date of Patent: Jul. 5, 2011

(54) APPARATUS FOR POSITION DETECTION USING MULTIPLE HCF TRANSMISSIONS

(75) Inventors: Ahmadreza (Reza) Rofougaran, Newport Coast, CA (US); Maryam Rofougaran, Rancho Palos Verdes, CA (US); Nambirajan Seshadri, Irvine, CA (US); Brima B. Ibrahim, Aliso Viejo, CA (US); John Walley, Ladera Ranch, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 311 days.

(21) Appl. No.: 12/128,785

(22) Filed: May 29, 2008

(65) Prior Publication Data
US 2008/0316085 A1 Dec. 25, 2008

Related U.S. Application Data

(60) Provisional application No. 60/936,724, filed on Jun. 22, 2007.

(51) Int. Cl.
*G01S 13/08* (2006.01)
*G01S 13/00* (2006.01)
*G06F 19/00* (2006.01)
*A63F 13/00* (2006.01)

(52) U.S. Cl. ........ 342/146; 342/118; 342/147; 342/188; 463/36; 463/39

(58) Field of Classification Search ............ 342/22, 342/118, 146, 147, 350, 359, 361, 444; 446/26; 463/36–42, 51; 472/133, 137
See application file for complete search history.

(56) References Cited

U.S. PATENT DOCUMENTS

| | | | |
|---|---|---|---|
| 3,816,830 A * | 6/1974 | Giannini | 342/374 |
| 4,309,703 A * | 1/1982 | Blahut | 342/201 |
| 6,400,307 B2 * | 6/2002 | Fullerton et al. | 342/28 |
| 6,643,526 B1 * | 11/2003 | Katz | 455/562.1 |
| 6,653,971 B1 * | 11/2003 | Guice et al. | 342/54 |
| 6,710,736 B2 * | 3/2004 | Fullerton et al. | 342/28 |
| 6,937,182 B2 * | 8/2005 | Lovberg et al. | 342/22 |
| 6,965,340 B1 * | 11/2005 | Baharav et al. | 342/22 |
| 6,967,612 B1 * | 11/2005 | Gorman et al. | 342/22 |
| 7,061,429 B2 * | 6/2006 | Fager et al. | 342/464 |
| 7,098,891 B1 * | 8/2006 | Pryor | 345/158 |

(Continued)

OTHER PUBLICATIONS

C. D. Haworth, Y. De Saint-Pern, Y. R. Petillot and E. Trucco: "Public Security Screening for Metallic Objects with Millimetre-Wave Images" Heriot-Watt University, United Kingdom, pp. 1-4.

(Continued)

*Primary Examiner* — Thomas H Tarcza
*Assistant Examiner* — Peter Bythrow
(74) *Attorney, Agent, or Firm* — Garlick Harrison & Markison

(57) ABSTRACT

An apparatus a transmitter section, a receiver section, and a processing module. The transmitter section transmits a plurality of high carrier frequency beamformed signals in a loop manner until a desired number of signals has been transmitted. The receiver section receives the plurality of high carrier frequency beamformed signals and determines reception properties of the plurality of high carrier frequency beamformed signals. The processing module determines at least one of: reflection, absorption, refraction, and pass through based on the reception properties. The processing module then distinguishes an animate entity from an inanimate entity based on the at least one of the reflection, absorption, refraction, and pass through. The processing module then determines position of the animate entity within a given physical area.

14 Claims, 13 Drawing Sheets

U.S. PATENT DOCUMENTS

| | | | |
|---|---|---|---|
| 7,148,836 B2 * | 12/2006 | Romero et al. | 342/22 |
| 7,324,784 B2 * | 1/2008 | Mizuguchi | 455/63.4 |
| 7,358,888 B2 * | 4/2008 | Fullerton et al. | 342/57 |
| 7,385,549 B2 * | 6/2008 | Lovberg et al. | 342/22 |
| 7,391,362 B2 * | 6/2008 | Beckner | 342/179 |
| 7,415,244 B2 * | 8/2008 | Kolinko et al. | 455/25 |
| 7,417,581 B2 * | 8/2008 | Fullerton et al. | 342/57 |
| 7,423,587 B2 * | 9/2008 | Mueller | 342/378 |
| 7,432,846 B2 * | 10/2008 | Martin et al. | 342/22 |
| 7,515,874 B2 * | 4/2009 | Nikolajevic et al. | 455/41.2 |
| 7,539,533 B2 * | 5/2009 | Tran | 600/509 |
| 7,592,944 B2 * | 9/2009 | Fullerton et al. | 342/57 |
| 7,623,115 B2 * | 11/2009 | Marks | 345/156 |
| 7,627,139 B2 * | 12/2009 | Marks et al. | 382/103 |
| 7,646,372 B2 * | 1/2010 | Marks et al. | 345/156 |
| 7,647,071 B2 * | 1/2010 | Rofougaran | 455/556.1 |
| 7,663,689 B2 * | 2/2010 | Marks | 348/370 |
| 7,701,392 B2 * | 4/2010 | Nakajima et al. | 342/359 |
| 2007/0210960 A1 * | 9/2007 | Rofougaran | 342/368 |
| 2008/0316085 A1 * | 12/2008 | Rofougaran et al. | 342/22 |

OTHER PUBLICATIONS

Hala Elsadek, Hesham Eldeeb, Franco De-Flaviis, Luis Jofre, Esmat Abdallah and Essam Hashish: "A Compact 3D-Microwave Holographic Pointer System Using a Size Reduced Microstrip Planar Array" Department of Electrical and Computer Engineering, University of California, pp. 1-5.

Hala Elsadek, Hesham Eldeeb, Franco De-Flaviis, Luis Jofre and Esmat Abdallah: "Microstrip Multi-element Diversity Antenna Array for Three Dimensional Microwave Holographic Input Pointer (Holo3D)" Department of Electrical and Computer Engineering, University of California, pp. 1-4.

E3 Wii Controller, Nintendo Wilmote: Technology Limitations, Xgaming, Inc., pp. 1-5.

* cited by examiner

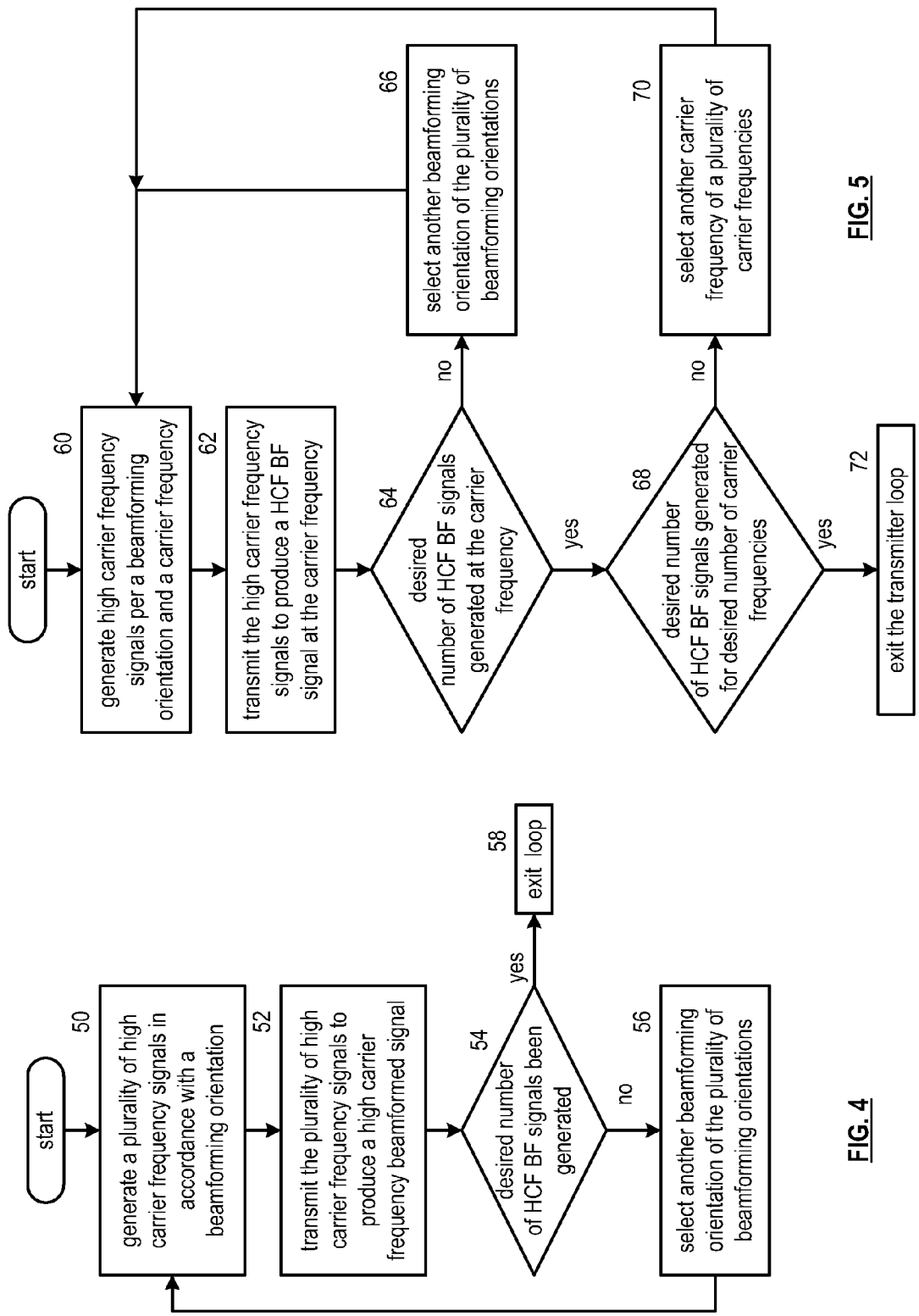

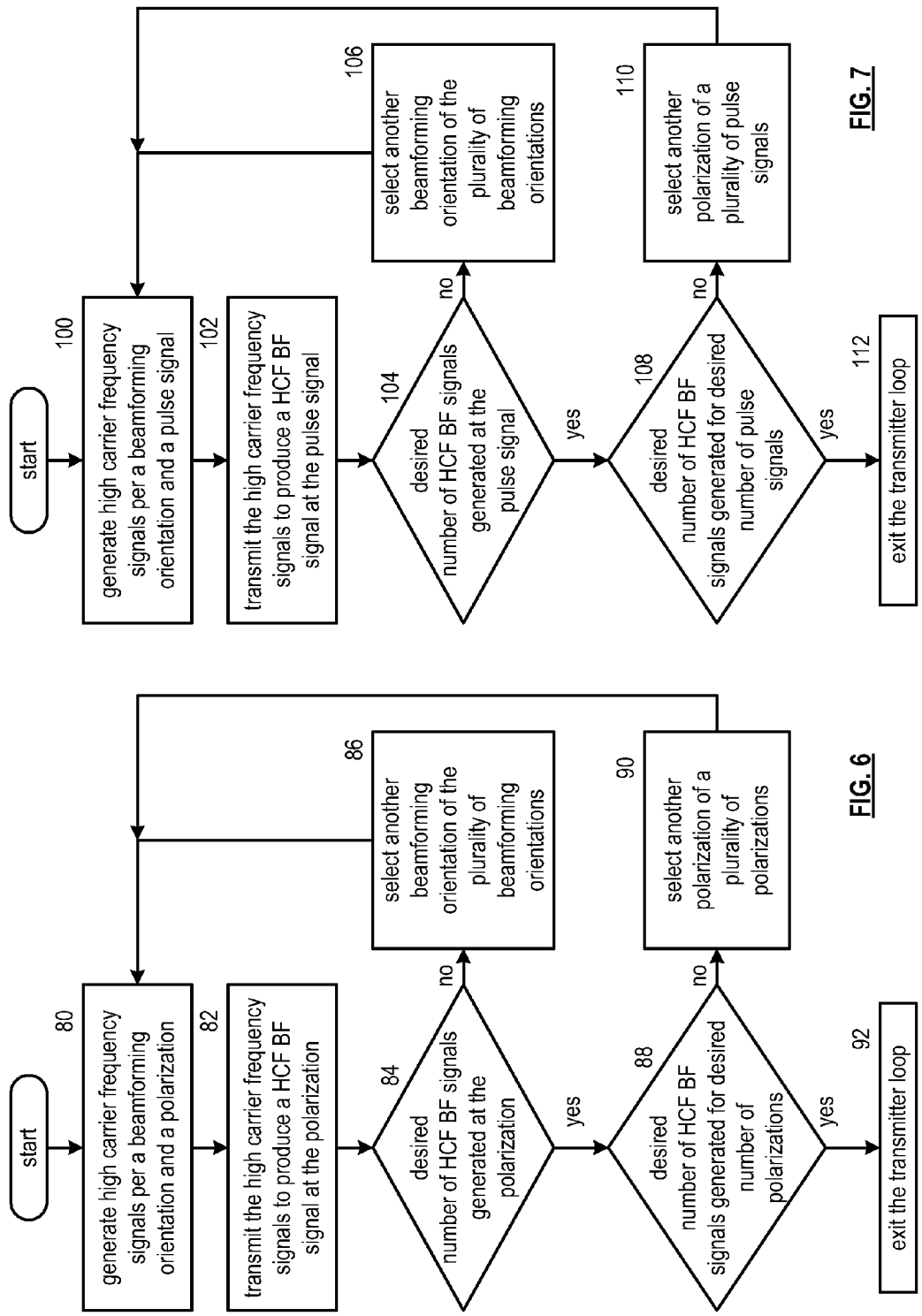

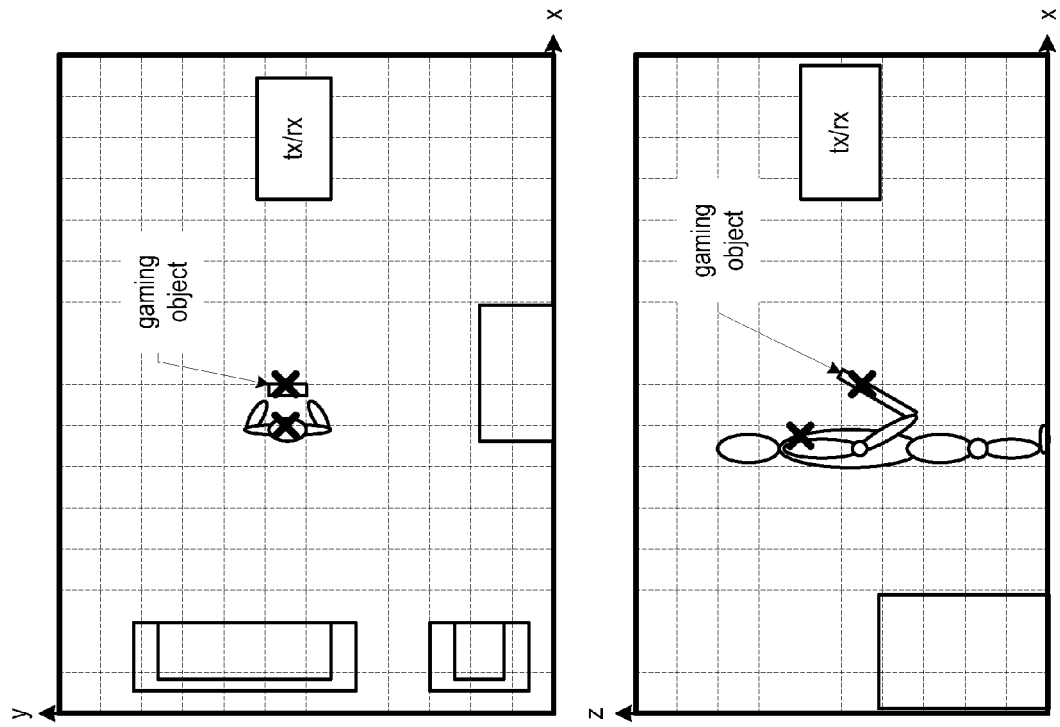
FIG. 15
FIG. 16
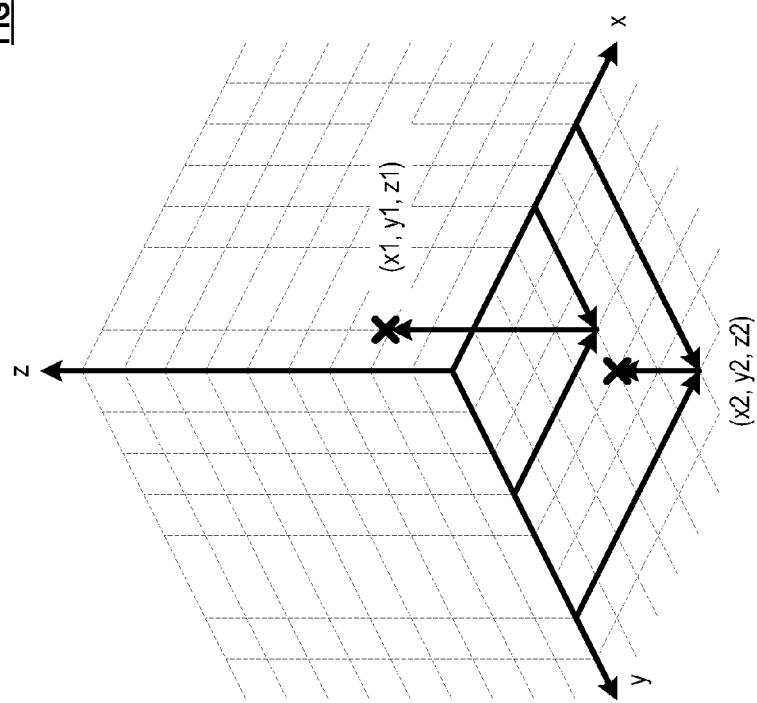
FIG. 14

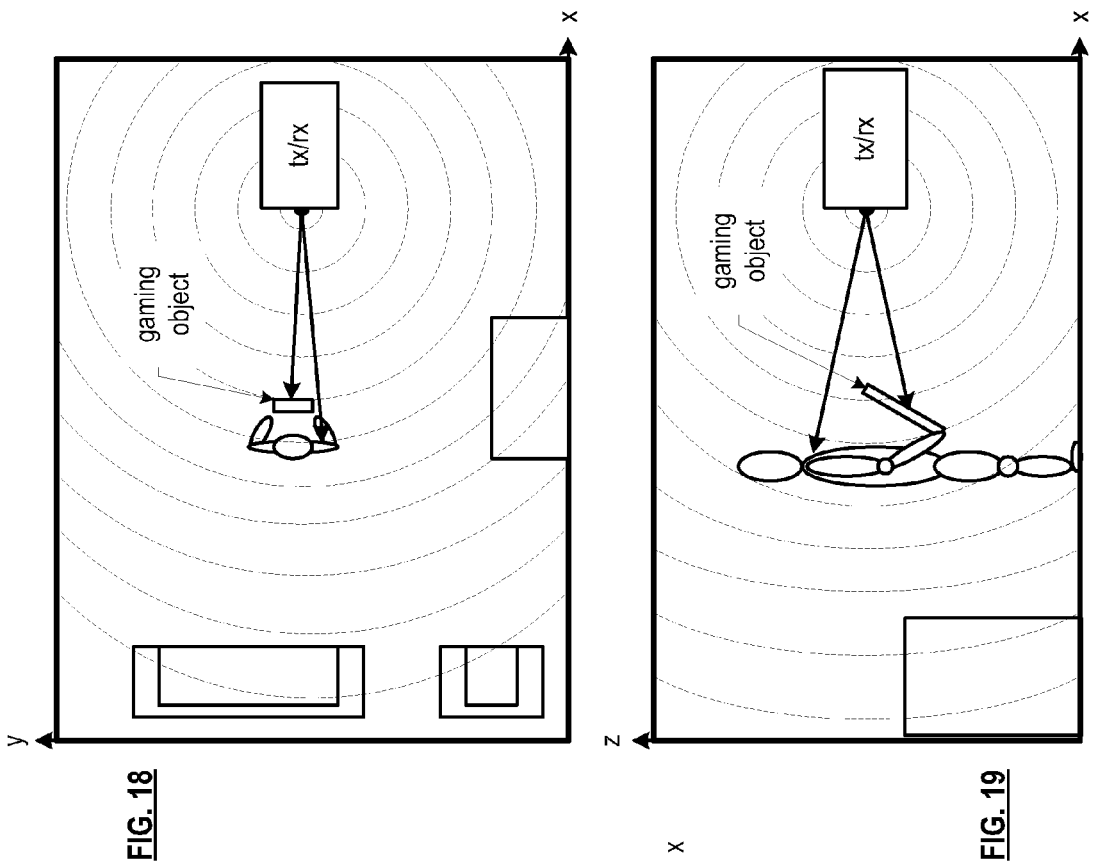
FIG. 18
FIG. 19
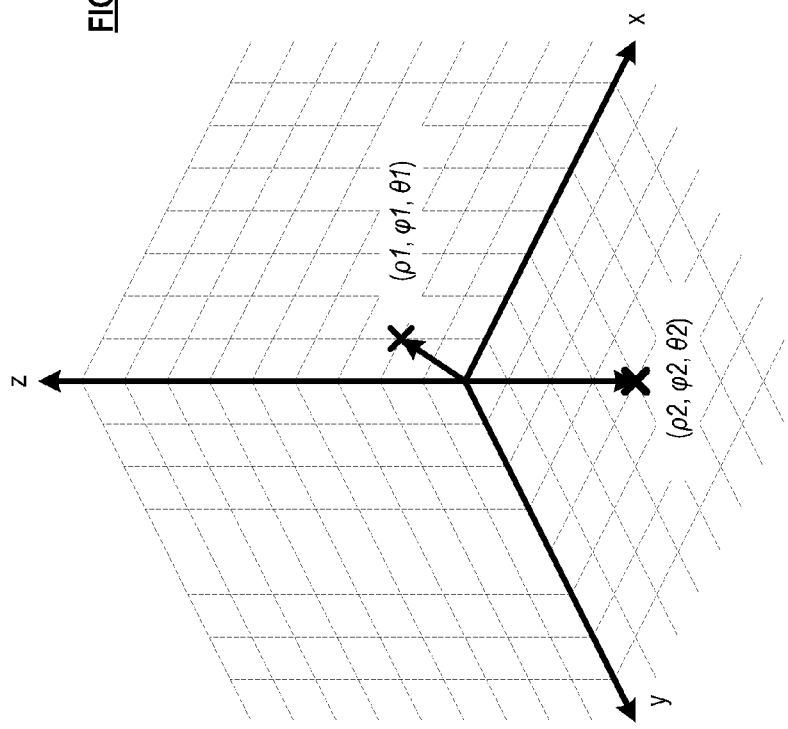
FIG. 17

APPARATUS FOR POSITION DETECTION USING MULTIPLE HCF TRANSMISSIONS

This patent application is claiming priority under 35 USC §119 to a provisionally filed patent application entitled POSITION AND MOTION TRACKING OF AN OBJECT, having a provisional filing date of Jun. 22, 2007, and a provisional Ser. No. of 60/936,724.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to wireless systems and more particularly to determining position within a wireless system and/or tracking motion within the wireless system.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most RF applications, radio transceivers are implemented on one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

In a particular application, millimeter wave (MMW) communications are used in public safety applications to detect a metal object on a moving person. This can be accomplished because millimeter wave signals penetrate clothing, plastics, and fabrics, but are reflected by metal objects. The responses of the MMW signals are captured and processed utilizing a statistical model to detect the metal object.

In radar applications, RF signals are used to detect the relative distance of an object. In general, when the receiver and transmitter are in the same location, the received power declines as the fourth power of the range, which can be use to determine the distance to an object. The transmission of the RF signals may be polarized to reduce interferences and/or to better detect certain objects. For instance, circular polarization is used to minimize the interference caused by rain; linear polarization for better detection of metal surfaces; and random polarization for better detecting fractal surfaces. Alternatively, the radar signals may be FM modulated to improve distance detect.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used in video games to detect the direction in which a game controller is pointed. As an example, an IR sensor is placed near the game display, where the IR sensor detects the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above video gaming technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

Therefore, a need exists for improved motion tracking and positioning determination for video gaming and other applications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 4 is a logic diagram of a method for producing a plurality of high carrier frequency beamformed signals in accordance with the present invention;

FIG. 5 is a logic diagram of another method for producing a plurality of high carrier frequency beamformed signals in accordance with the present invention;

FIG. 6 is a logic diagram of another method for producing a plurality of high carrier frequency beamformed signals in accordance with the present invention;

FIG. 7 is a logic diagram of another method for producing a plurality of high carrier frequency beamformed signals in accordance with the present invention;

FIGS. 14-16 are diagrams of an embodiment of a coordinate system of a gaming system in accordance with the present invention; and FIGS. 17-19 are diagrams of another embodiment of a coordinate system of a gaming system in accordance with the present invention.

DETAILED DESCRIPTION OF THE INVENTION

Figure 1:
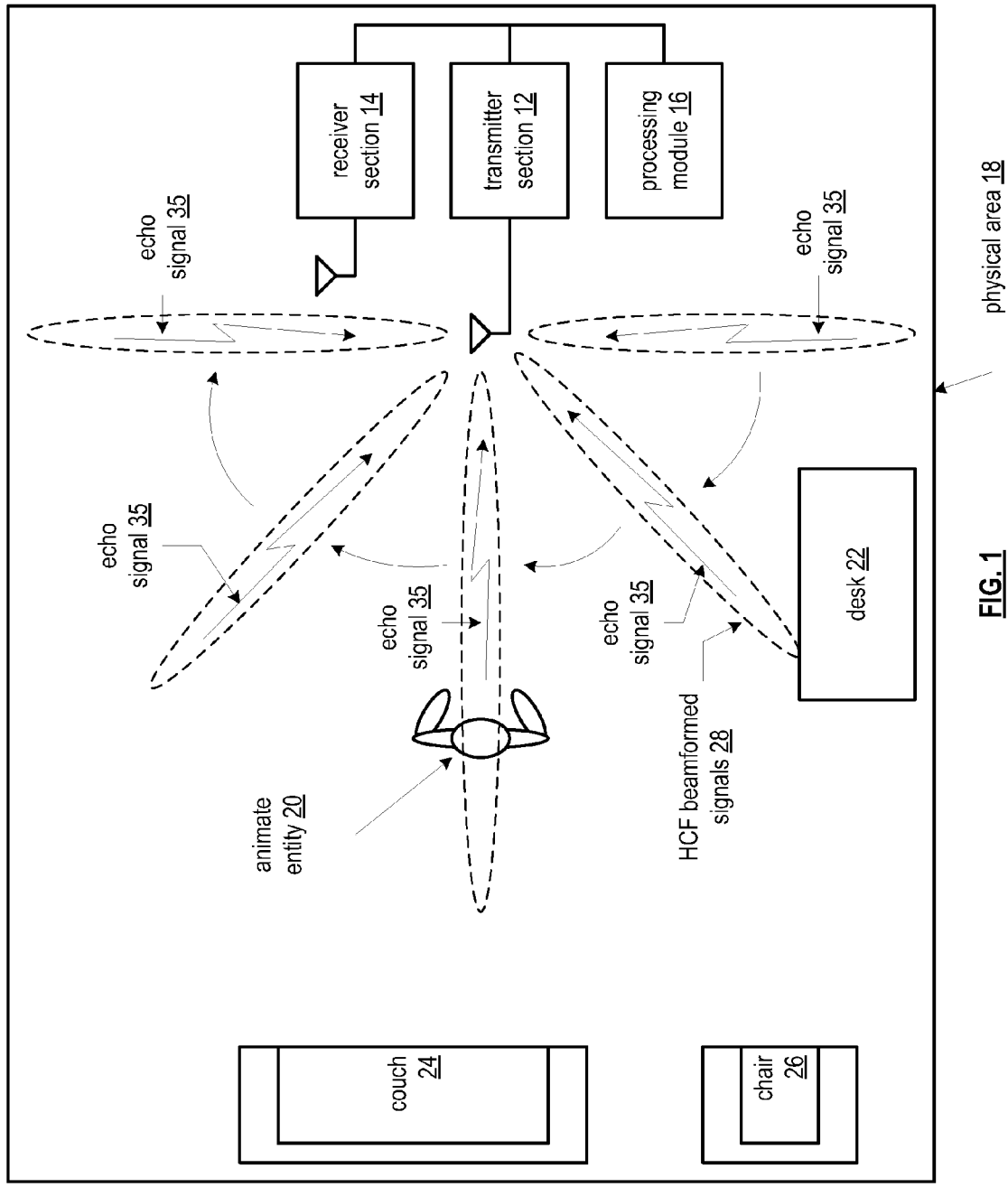
FIG. 1 is a top view diagram of an embodiment of an apparatus for determining position in accordance with the present invention.

FIG. 1 is a top view diagram of an embodiment of an apparatus that includes a transmitter section 12, a receiver section 14, and a processing module 16. The apparatus is located within a physical area 18 that is a confined area such as a room, an office, etc. or an unconfined area such as a section of an airport, mall, outdoors, etc. Also located within the physical area 18 may be a plurality of inanimate objects (e.g., desk 22, couch 24, chair 26, walls, floor, ceiling, trees, etc.) and one or more animate objects 20 (e.g., a person, a dog, a cat, etc.).

To distinguish the animate object 20 from the inanimate objects 22-26 and to determine the position of the animate object, the transmitter section 12 enters a loop to generate a plurality of high carrier frequency beamformed signals 28. The high carrier frequency (HCF) beamformed signals 28 have a carrier frequency in the RF band (30 Hz to 3 GHz) and/or the microwave frequency band (3 GHz to 300 GHz) and have a corresponding beamform orientation (e.g., a three dimensional angle of transmission). Within the loop, the transmitter section 12 essentially sweeps the physical area with the HCF beamformed signals 28. Various embodiments of generating the HCF beamformed signals 28 will be further described with reference to FIGS. 4-8.

The receiver section 14 receives echo signals 35 of at least some of the desired number of high carrier frequency beamformed signals 28. For example, when the transmitter section 12 transmits a HCF beamformed signal 28, the signal travels at the speed of light in the direction of the beamform orientation and bounces off of, passes through, and/or is absorbed by objects in the path of the signal 28. The receiver section 14, which includes one or more receivers, receives the bounce offs and/or pass-throughs as an echo signal 35. Depending on the beamforming orientation, the antenna of the receiver, and the positioning of the receiver section 14 with respect to the transmitter, an echo signal 35 may or may not be received for a given HCF beamformed signal 28.

For a received echo signal 35, the receiver section 14 determines properties of the echo signal 35. The properties include one or more of a received signal strength, a phase shift, a frequency shift, and a Doppler effect. For example, the receiver section 14 may include a received signal strength indicator, a low noise amplifier, and a down conversion module that generates a baseband signal, which includes a phase shift component and/or a frequency shift component.

The processing module 16 determines at least one of reflection, absorption, refraction, and pass-through based on the properties of the echo signals 35. Such a determination may be made based on the known properties (e.g., transmit power, beamform orientation, carrier frequency, speed of light, etc.) of the transmitted high carrier frequency (HCF) signal 28 in comparison to the properties of the received echo signal 35.

The processing module 16 continues processing by distinguishing an animate entity (e.g., person 20) from an inanimate entity (e.g., objects 22-26, walls, ceiling, floor, etc.) based on the at least one of the reflection, absorption, refraction, and pass through. For example, since animate objects (e.g., people) have a different composition than inanimate objects, high frequency signals reflect, are absorbed, refract, and/or pass through animate objects differently than are reflected, absorbed, refracted, and/or pass through inanimate objects. The difference in reflection, absorption, refraction, and/or pass through is processed to differentiate inanimate objects from animate entities.

The processing module 16 continues processing by determining position of the animate entity 20 within a given physical area 18. For example, the processing module 16 may determine the distance between the animate entity 20 and the receiver section 14 based on the known transmit power level of the HCF beamformed signals 28 and the received power levels of the echo signals 35. Since the signals 28 travel at the speed of light and the received power declines as the fourth power of the range, the distance between the receiver section 14 and the animate entity 20 can be readily calculated. In an embodiment, the receiver section 14 includes a plurality of receivers that are physically distributed within the physical area 18. The processing module 16 determines the distance between each receiver and the animate entity to obtain a plurality of distances. From the plurality of distances, the position of the animate entity with respect to the receivers can be determined. The position of the animate entity is then mapped to a coordinate system for the physical area 18. Examples of coordinate systems will be discussed with reference to FIGS. 14-19.

Figure 2:
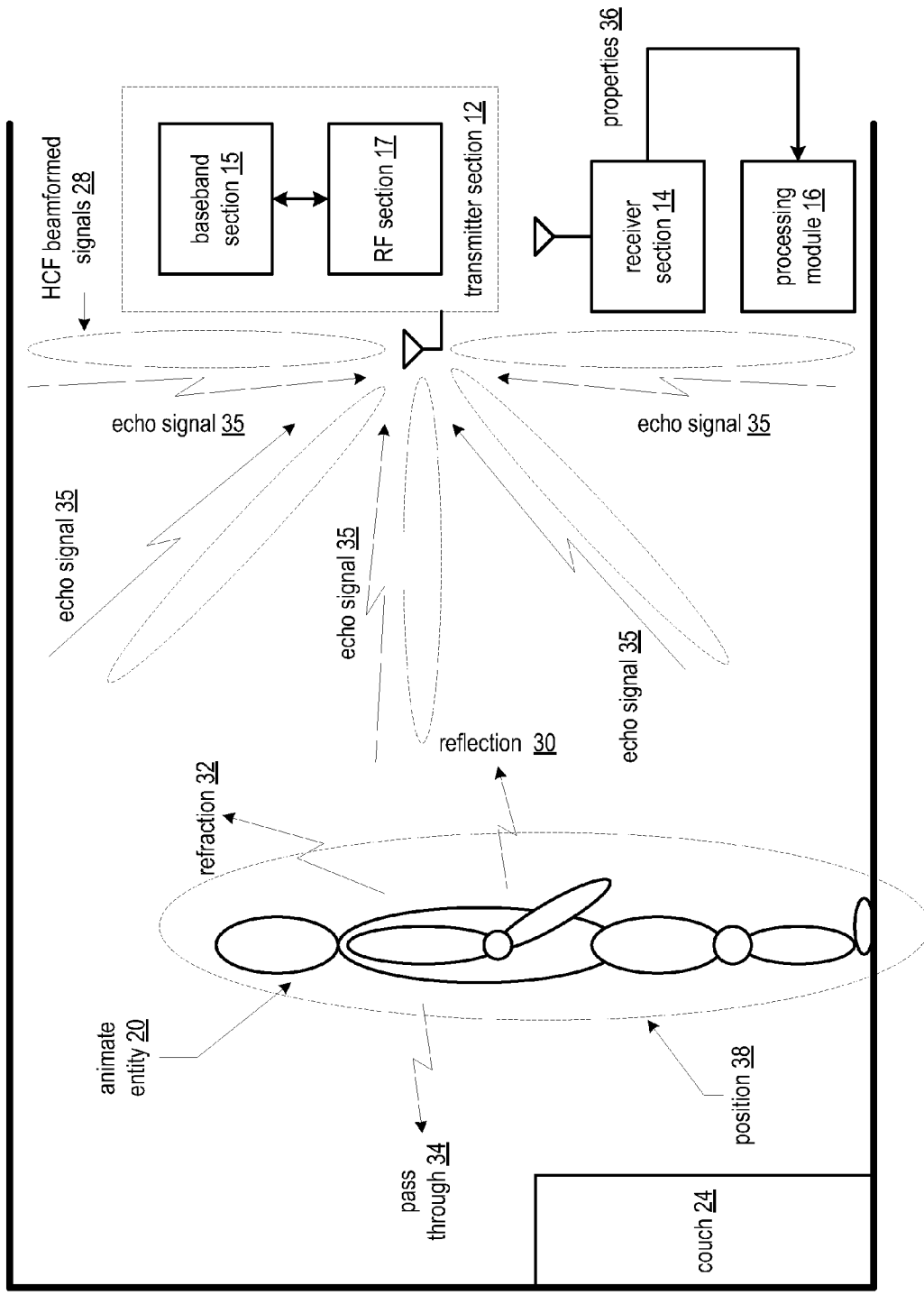
FIG. 2 is a side view diagram of the embodiment of an apparatus for determining position in accordance with the present invention.

FIG. 2 is a side view diagram of the embodiment of an apparatus that includes a transmitter section 12, a receiver section 14, and a processing module 16. In this figure, the transmitter section 12 includes a baseband section 15 and a radio frequency (RF) section 17. The baseband section 15 may be a separate device from the processing module 16 or may be the same device. The baseband section 15 and/or the processing module 16 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The baseband section 15 and/or the processing module 16 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the baseband section 15 and/or the processing module 16 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the baseband section 15 and/or the processing module 16 executes, hard coded and/or operational instructions corresponding to at least some of the steps and/or functions illustrated in FIGS. 1-19.

An aspect of this perspective of transmitting the HCF beamformed signals 28 is to illustrate that the transmitter section 12 is capable of generating narrowly focused signals 28 to target different locations of the physical area in three dimensions. To achieve this, the transmitter section 12 includes a plurality of antennas that transmit a high carrier frequency (HCF) signal in accordance with particular beamforming coefficients and/or phase offsets. The combination of the plurality of HCF signals in air produces the HCF beamformed signal 28 for this particular location in three-dimensional space (i.e., beamformed orientation).

In an embodiment, the baseband section 15 generates the plurality of beamforming coefficients for a given beamformed orientation and/or the RF section 17 generates and/or receives the plurality of phase offsets. For example, the baseband section 15 may include a signal generator (e.g., a phase locked loop, a direct digital frequency synthesizer (DDFS), etc.) to generate a signal [e.g., $A_0 \cos(\omega_0(t))$]. For baseband beamforming, the signal is processed by a beamforming module that introduces the beamforming coefficients (e.g., $\beta_n$) to produce a plurality of signals [e.g., $A_0 \cos(\omega_0(t)+\beta_0)$; $A_0 \cos(\omega(t)+\beta_1)$; ... ; $A_0 \cos(\omega_0(t)+\beta_n)$].

The plurality of signals are mixed with a local oscillation [e.g., $\cos(\omega_{RF}(t))$] to produce a plurality of high carrier frequency signals [e.g., $A_0 \cos(\omega_0(t)+\omega_{RF}(t)+\beta_0)$; $A_0 \cos(\omega_0(t)+\omega_{RF}(t)+\beta_1)$; ... ; $A_0 \cos(\omega_0(t)+\omega_{RF}(t)+\beta_n)$]. The plurality of high carrier frequency signals are amplified via power amplifiers and transmitted via a plurality of antennas. The signals combine in air to produce the high carrier frequency beamformed signal 28. Note that the mixing function and power amplifiers may be within the RF section 17.

As another example, the baseband section 15 include the signal generator to generate a signal [e.g., $A_0 \cos(\omega_{RF}(t))$, where RF corresponds to the desired carrier frequency]. The signal is routed to a plurality of phase offset modules that introduce a different phase offset (e.g., $(\phi_n)$) to produce a plurality of high carrier frequency signals [e.g., $A_0 \cos(\omega_{RF}(t)+\phi_0)$; $A_0 \cos(\omega_{RF}(t)+\phi_1)$; ... ; $A_0 \cos(\omega_{RF}(t)+\phi_n)$]. The plurality of high carrier frequency signals are amplified via power amplifiers and transmitted via a plurality of antennas. The signals combine in air to produce the high carrier frequency beamformed signal 28.

The receiver section 14 may include one or more receivers, where a receiver includes one or more low noise amplifiers (LNA) coupled to one more antennas, one more down conversion sections, and one or more property detection modules. As an example, the receiver section 14 amplifies an echo signal 35 to produce one or more amplified echo signals (e.g., one for each antenna and LNA pairing). The receiver section 14 mixes in-phase (I) and quadrature (Q) components of the amplified echo signals with in-phase and quadrature components of a local oscillation [e.g., $\cos(\omega_{RF}(t))$] to produce a mixed I signal and a mixed Q signal. The mixed I and Q signals are combined to produce an inbound symbol stream at or near baseband. In this example, the inbound symbol may include phase shift information (e.g., $+/-\Delta\theta$ and/or $\theta(t)$) and/or frequency shift information (e.g., $+/-\Delta f$).

The property detection modules interpret the inbound symbol stream to determine a phase shift and/or a frequency shift. In addition, a property detection module may include a received signal strength indicator that measures the receive power of the echo signal 35. Further, a property detection module may determine a Doppler effect of the echo signal. The receiver section 14 provides the phase shift, frequency shift, the receive power level, and/or the Doppler effect to the processing module 16 as properties 36 of the echo signal 35.

As discussed, the processing module 16 determines at least one of reflection 30, absorption, refraction 32, and pass-through 34 based on the properties 36 of the echo signals 35. The processing module 16 continues processing by distinguishing an animate entity (e.g., person 20) from an inanimate entity (e.g., objects 22-26, walls, ceiling, floor, etc.) based on the at least one of the reflection, absorption, refraction, and pass through. The processing module 16 continues processing by determining position 38 of the animate entity 20 within a given physical area 18.

Figure 3:
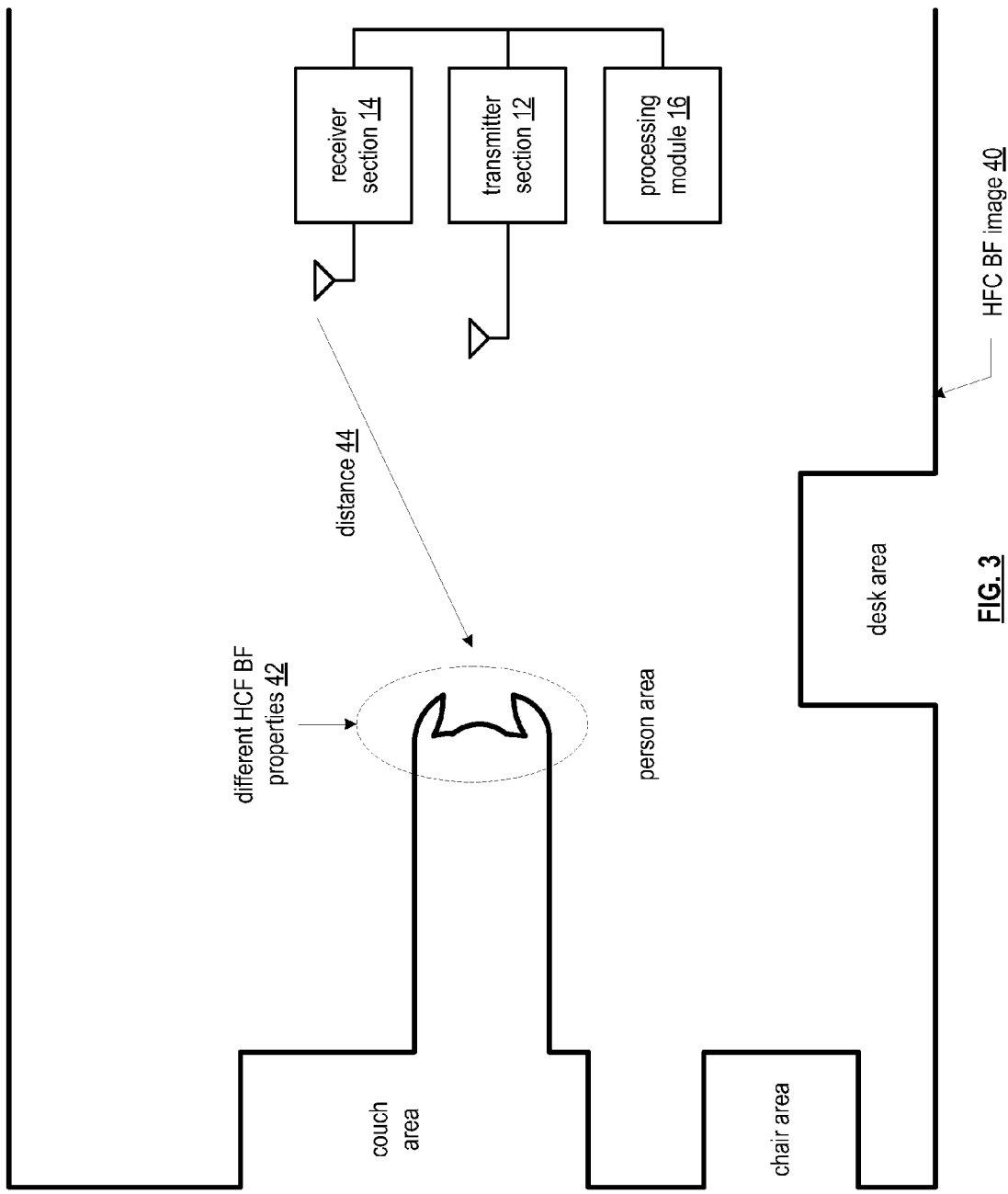
FIG. 3 is a diagram of an embodiment of a high carrier frequency beamformed image in accordance with the present invention.

FIG. 3 is a diagram of an embodiment of a high carrier frequency beamformed image 40 produced via the apparatus that includes the transmitter section 12, the receiver section 14, and the processing module 16. In this illustration, as the transmitter section 12 sweeps the physical area 18 with the high carrier frequency (HCF) beamformed signals 28, the receiver section 14 receives echo signals thereof, and the processing module 16 processes the properties of the echo signals to determine animate versus inanimate objects and distance 44 to the objects. From these distinctions (e.g., animate and inanimate have different HCF BF signal properties 42) and the distances, the processing module 16 can generate an image 40 of the physical area.

From the image 40, the distances 44, and the distinctions, the processing module 16 can determine position of a person (e.g., person area) versus inanimate objects position (e.g., desk area, chair area, couch area, walls, ceiling, floor, etc.) based on one or more distances 44. The processing module may then map the position to a coordinate system, wherein the coordinate system is applied to the given physical area. The processing module may further track the motion of the animate entity by determining various positions of the animate entity within the given physical area.

FIG. 4 is a logic diagram of a method for producing a plurality of high carrier frequency beamformed signals that may be performed by the transmitter section 12. The method begins at step 50 where the transmitter section 12 generates a plurality of high carrier frequency signals in accordance with a beamforming orientation of a plurality of beamforming orientations. Examples of this were discussed with reference to FIGS. 1 and 2. The method continues at step 52 where the transmitter section 12 transmits the plurality of high carrier frequency signals to produce a high carrier frequency beamformed signal. In an embodiment, the transmitter section 12 will be coupled to a plurality of antennas, one for each of the high carrier frequency beamformed signals being transmitted.

The method continues at step 54 where the transmitter section 12 determines whether a desired number of high carrier frequency beamformed (HCF BF) signals has been generated. The number of HCF BF signals to generate and subsequently transmit depends on the granularity of the beamforming orientation (i.e., how narrowly focused a HCF BF signal is), size of the physical area, details of the physical area, and/or resolution requirements (i.e., how detailed to make the image of the physical area). If the desired number of HCF BF signals has been transmitted, the method proceeds to step 58 where the loop is exited. Note that the loop can be repeated as often as desired to update position of animate objects to track their motion.

When the desired number of the high carrier frequency beamformed signals has not been generated, the method continues at step 56 where the transmitter section selections another beamforming orientation of the plurality of beamforming orientations. The method then repeats at step 50 using the another beamforming orientation.

FIG. 5 is a logic diagram of another method for producing a plurality of high carrier frequency beamformed signals that may be performed by the transmitter section 12. The method begins at step 60 where the transmitter section 12 generates a plurality of high carrier frequency signals in accordance with a beamforming orientation of a plurality of beamforming orientations and a carrier frequency of a plurality of carrier frequencies (e.g., one or more frequencies within the range of a few GHz to a 100 or more GHz). As is known, the reflection, absorption, refraction, and/or pass-through of signals by animate and inanimate objects vary with frequency. Thus, by changing the frequency and interpreting the resulting echo signals, inanimate objects may be more easily distinguished from animate objects. In addition, the use of various carrier frequencies may aid in the determination of distances and thus in the determination of the animate object's position. The method continues at step 62 where the transmitter section 12 transmits the resulting signals.

The method continues at step 64 where the transmitter section 12 determines whether a desired number of high carrier frequency beamformed (HCF BF) signals has been generated at the current carrier frequency. When the desired number of the high carrier frequency beamformed signals has not been generated for the current carrier frequency, the method continues at step 66 where the transmitter section selections another beamforming orientation of the plurality of beamforming orientations. The method then repeats at step 60 using the another beamforming orientation.

If the desired number of HCF BF signals has been transmitted using the current carrier frequency, the method proceeds to step 68 where the transmitter section 12 determines whether a desired number of high carrier frequency beamformed (HCF BF) signals has been generated using a desired number of carrier frequencies. When the desired number of the high carrier frequency beamformed signals has not been generated using the desired number of carrier frequencies, the method continues at step 70 where the transmitter section selections another carrier frequency of the plurality of carrier frequencies. The method then repeats at step 60 using the another carrier frequency. When the desired number of the high carrier frequency beamformed signals has been generated using the desired number of carrier frequencies, the method proceeds to step 72 where the transmitter section exits the loop. Note that the loop can be repeated as often as desired to update position of animate objects to track their motion.

FIG. 6 is a logic diagram of another method for producing a plurality of high carrier frequency beamformed that may be performed by the transmitter section 12. The method begins at step 80 where the transmitter section 12 generates a plurality of high carrier frequency signals in accordance with a beamforming orientation of a plurality of beamforming orientations and a polarization of a plurality of polarizations (e.g., one or more of linear, circular, random, etc.). As is known, circular polarization minimizes interference in the air, linear polarization is beneficial in identifying metal surfaces, and random polarization is beneficial in identifying fractal surfaces. The method continues at step 82 where the transmitter section 12 transmits the resulting signals.

The method continues at step 84 where the transmitter section 12 determines whether a desired number of high carrier frequency beamformed (HCF BF) signals has been generated at the current polarization. When the desired number of the high carrier frequency beamformed signals has not been generated for the current polarization, the method continues at step 86 where the transmitter section selections another beamforming orientation of the plurality of beamforming orientations. The method then repeats at step 80 using the another polarization.

If the desired number of HCF BF signals has been transmitted using the current polarization, the method proceeds to step 88 where the transmitter section 12 determines whether a desired number of high carrier frequency beamformed (HCF BF) signals has been generated using a desired number of polarizations. When the desired number of the high carrier frequency beamformed signals has not been generated using the desired number of polarizations, the method continues at step 90 where the transmitter section selections another polarization of the plurality of polarizations. The method then repeats at step 80 using the another polarization. When the desired number of the high carrier frequency beamformed signals has been generated using the desired number of polarizations, the method proceeds to step 92 where the transmitter section exits the loop. Note that the loop can be repeated as often as desired to update position of animate objects to track their motion. In addition, the methods of FIGS. 5 and 6 may be combined to add further resolution in determining distances and/or in distinguishing animate and inanimate objects.

FIG. 7 is a logic diagram of another method for producing a plurality of high carrier frequency beamformed signals that may be performed by the transmitter section 12. The method begins at step 100 where the transmitter section 12 generates a plurality of high carrier frequency signals in accordance with a beamforming orientation of a plurality of beamforming orientations and a pulse signal of a plurality of pulse signals (e.g., one or more pulse signals of varying pulse widths and/or of varying pulse repetition times.). As is known, the transmission of a pulse signal and measuring the subsequent reception of the echo signal aids in the determination of distance. The method continues at step 102 where the transmitter section 12 transmits the resulting signals.

The method continues at step 104 where the transmitter section 12 determines whether a desired number of high carrier frequency beamformed (HCF BF) signals has been generated using the current pulse signal. When the desired number of the high carrier frequency beamformed signals has not been generated using the current pulse signal, the method continues at step 106 where the transmitter section selections another beamforming orientation of the plurality of beamforming orientations. The method then repeats at step 100 using the another pulse signal.

If the desired number of HCF BF signals has been transmitted using the current pulse signal, the method proceeds to step 108 where the transmitter section 12 determines whether a desired number of high carrier frequency beamformed (HCF BF) signals has been generated using a desired number of pulse signals. When the desired number of the high carrier frequency beamformed signals has not been generated using the desired number of pulse signals, the method continues at step 110 where the transmitter section selections another pulse signal of the plurality of pulse signals. The method then repeats at step 100 using the another pulse signal. When the desired number of the high carrier frequency beamformed signals has been generated using the desired number of pulse signals, the method proceeds to step 112 where the transmitter section exits the loop. Note that the loop can be repeated as often as desired to update position of animate objects to track their motion.

Figure 8:
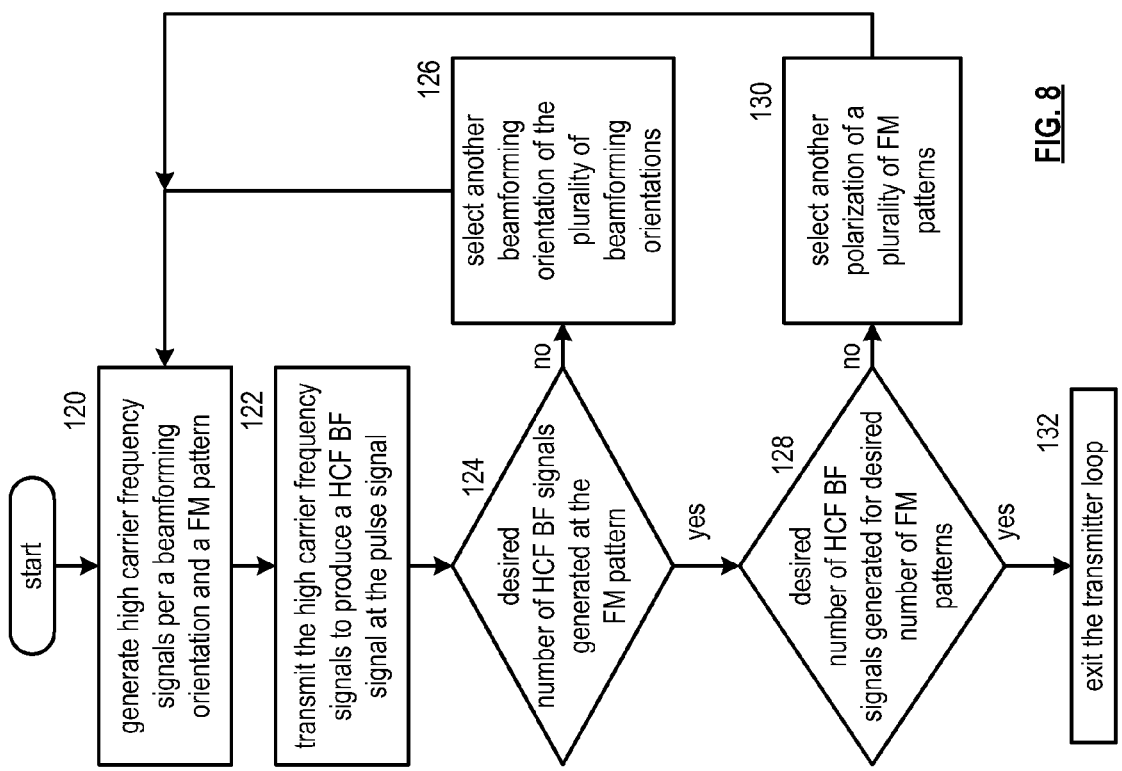
FIG. 8 is a logic diagram of another method for producing a plurality of high carrier frequency beamformed signals in accordance with the present invention.

FIG. 8 is a logic diagram of another method for producing a plurality of high carrier frequency beamformed signals that may be performed by the transmitter section 12. The method begins at step 120 where the transmitter section 12 generates a plurality of high carrier frequency signals in accordance with a beamforming orientation of a plurality of beamforming orientations and a frequency modulation of a plurality of frequency modulations (e.g., one or more different frequency modulation rates). As is known, frequency modulation is useful in determining distances by measuring the change in frequency between the transmitted signal and the received echo signal. The method continues at step 122 where the transmitter section 12 transmits the resulting signals.

The method continues at step 124 where the transmitter section 12 determines whether a desired number of high carrier frequency beamformed (HCF BF) signals has been generated at the current frequency modulation. When the desired number of the high carrier frequency beamformed signals has not been generated for the current frequency modulation, the method continues at step 126 where the transmitter section selections another beamforming orientation of the plurality of beamforming orientations. The method then repeats at step 120 using the another frequency modulation.

If the desired number of HCF BF signals has been transmitted using the current frequency modulation, the method proceeds to step 128 where the transmitter section 12 determines whether a desired number of high carrier frequency beamformed (HCF BF) signals has been generated using a desired number of frequency modulations. When the desired number of the high carrier frequency beamformed signals has not been generated using the desired number of frequency modulations, the method continues at step 130 where the transmitter section selections another frequency modulation of the plurality of frequency modulation. The method then repeats at step 120 using the another frequency modulation. When the desired number of the high carrier frequency beamformed signals has been generated using the desired number of frequency modulations, the method proceeds to step 132 where the transmitter section exits the loop. Note that the loop can be repeated as often as desired to update position of animate objects to track their motion. In addition, the methods of FIGS. 5 and 8 may be combined to add further resolution in determining distances and/or in distinguishing animate and inanimate objects.

Figure 9:
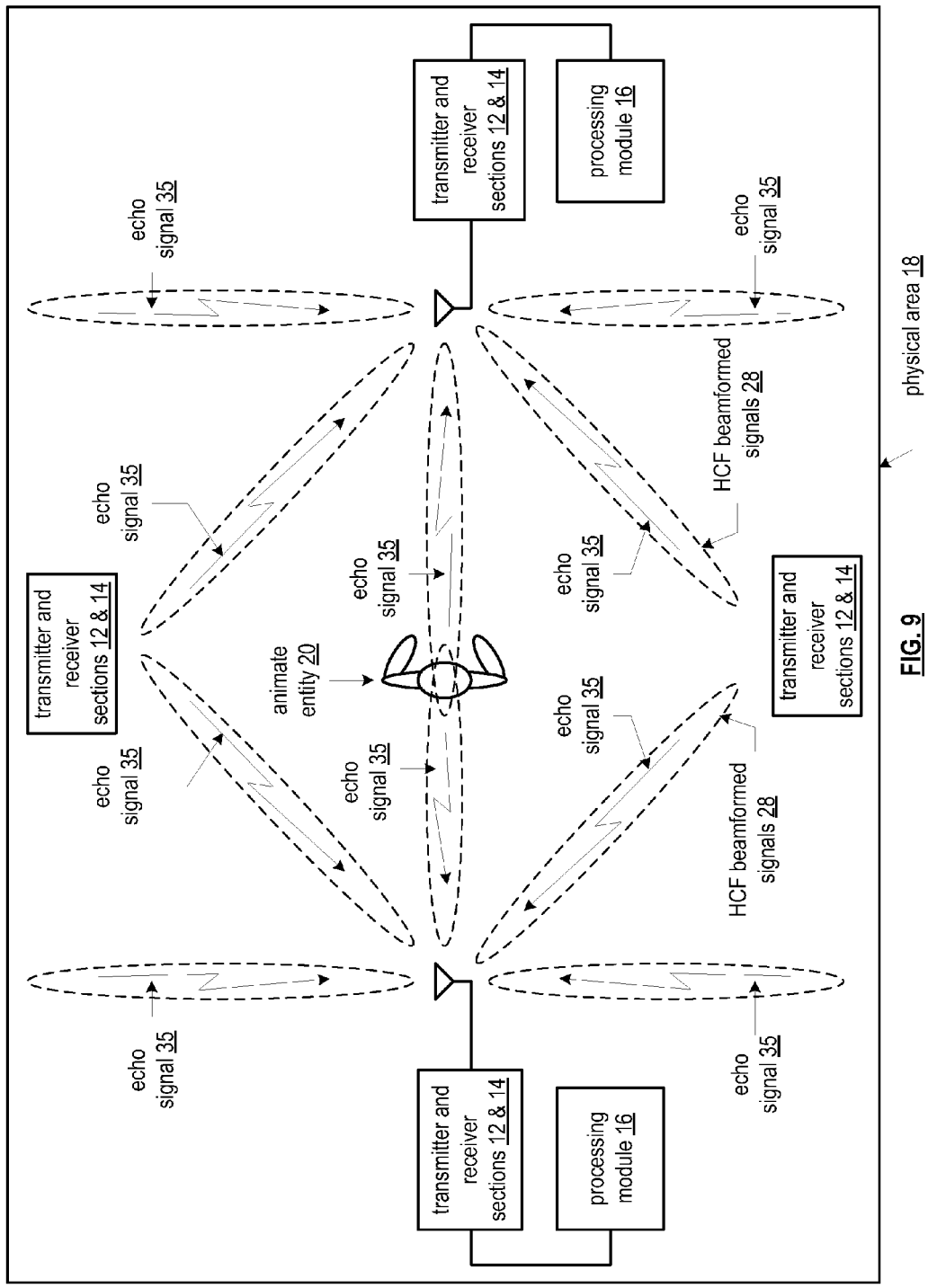
FIG. 9 is a top view diagram of an embodiment of an apparatus for determining position in accordance with the present invention.

FIG. 9 is a top view diagram of an embodiment of an apparatus for determining position that includes a plurality of transmitter sections 12, a plurality of receiver sections 14, and at least one processing module 16. The apparatus is located within a physical area 18 that is a confined area such as a room, an office, etc. or an unconfined area such as a section of an airport, mall, outdoors, etc. Also located within the physical area 18 may be a plurality of inanimate objects (e.g., desk 22, couch 24, chair 26, walls, floor, ceiling, trees, etc., which are not shown in this Figure) and one or more animate objects 20 (e.g., a person, a dog, a cat, etc.).

To distinguish the animate object 20 from the inanimate objects 22-26 and to determine the position of the animate object, each the transmitter sections 12 enters a loop to generate a plurality of high carrier frequency beamformed signals 28. The transmitter sections 12 may be active simultaneously using different carrier frequencies or active in a multiplexed manner (e.g., time multiplexed, frequency multiplexed, and/or code multiplexed). The high carrier frequency (HCF) beamformed signals 28 have a carrier frequency in the RF band (30 Hz to 3 GHz) and/or the microwave frequency band (3 GHz to 300 GHz) and have a corresponding beamform orientation (e.g., a three dimensional angle of transmission). Within the loop, the transmitter section 12 essentially sweeps the physical area with the HCF beamformed signals 28.

Each of the receiver section 14 receives echo signals 35 of at least some of the desired number of high carrier frequency beamformed signals 28 transmitted by one or more of the transmitter sections 12. For a received echo signal 35, a receiver section 14 determines properties of the echo signal 35. The properties include one or more of a received signal strength, a phase shift, a frequency shift, and a Doppler effect.

The processing module 16, which is coupled to one or more of the transmitter sections 12 and one or more of the receiver sections 14, determines at least one of reflection, absorption, refraction, and pass-through based on the properties of the echo signals 35. The processing module 16 continues processing by distinguishing an animate entity (e.g., person 20) from an inanimate entity (e.g., objects 22-26, walls, ceiling, floor, etc.) based on the at least one of the reflection, absorption, refraction, and pass through. The processing module 16 continues processing by determining position of the animate entity 20 within a given physical area 18. For example, the processing module 16 may determine the distance between the animate entity 20 and the receiver section 14 based on the known transmit power level of the HCF beamformed signals 28 and the received power levels of the echo signals 35. Since the signals 28 travel at the speed of light and the received power declines as the fourth power of the range, the distance between the receiver section 14 and the animate entity 20 can be readily calculated.

Figure 10:
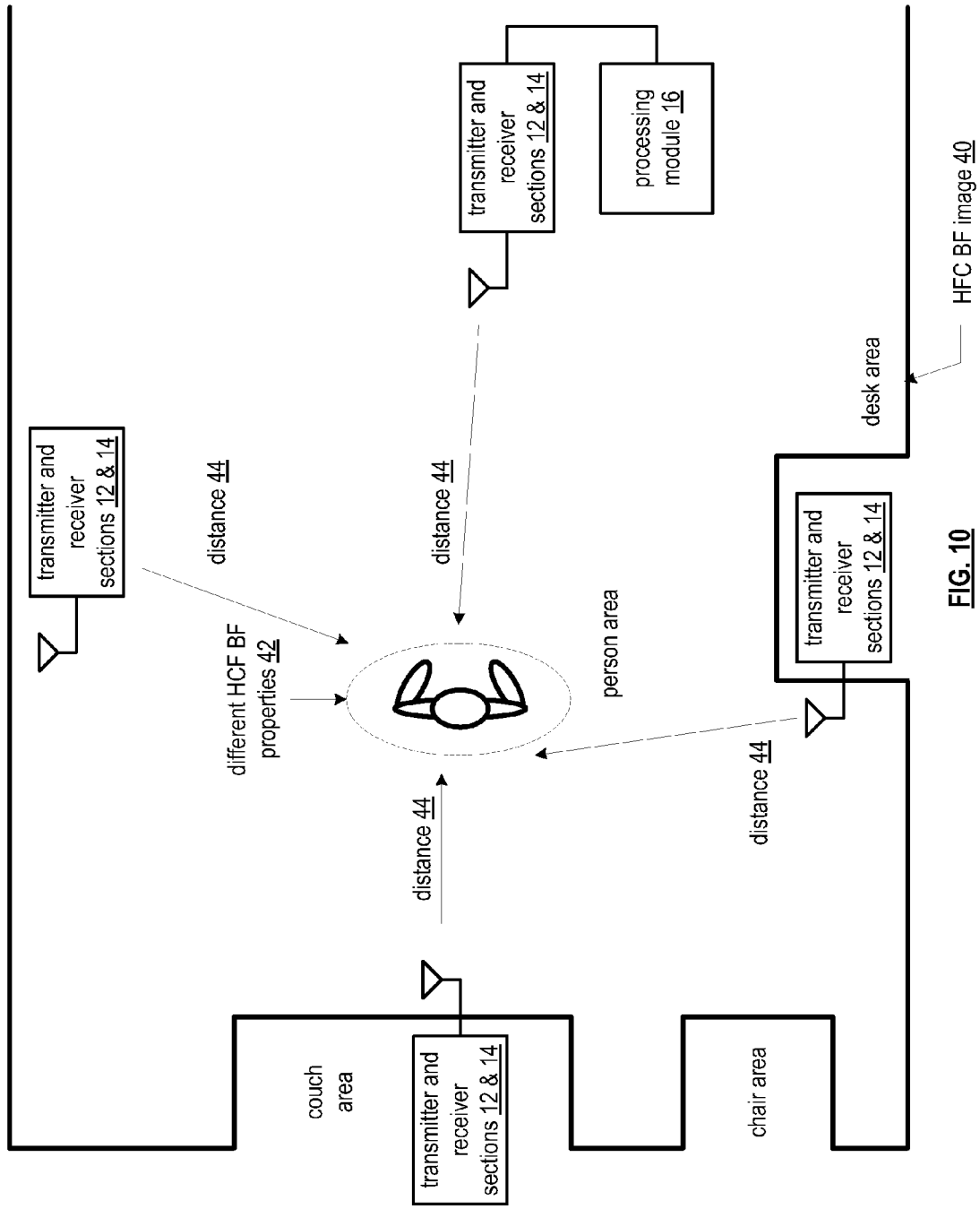
FIG. 10 is a diagram of an embodiment of a high carrier frequency beamformed image in accordance with the present invention.

FIG. 10 is a diagram of an embodiment of a high carrier frequency beamformed image produced via the apparatus of FIG. 9. In this illustration, as the transmitter sections 12 sweep the physical area 18 with their high carrier frequency (HCF) beamformed signals 28, the receiver sections 14 receive echo signals 35 thereof, and the processing module 16 processes the properties of the echo signals to determine animate versus inanimate objects and distances 44 between the receiver sections 14 and the animate entity 20. From these distinctions (e.g., animate and inanimate have different HCF BF signal properties 42) and the distances 44, the processing module 16 can generate an image 40 of the physical area.

From the image 40, the distances 44, and the distinctions, the processing module 16 can determine position of a person (e.g., person area) versus inanimate objects position (e.g., desk area, chair area, couch area, walls, ceiling, floor, etc.) based on one or more distances 44. The processing module may then map the position to a coordinate system, wherein the coordinate system is applied to the given physical area. The processing module may further track the motion of the animate entity by determining various positions of the animate entity within the given physical area.

Figure 11:
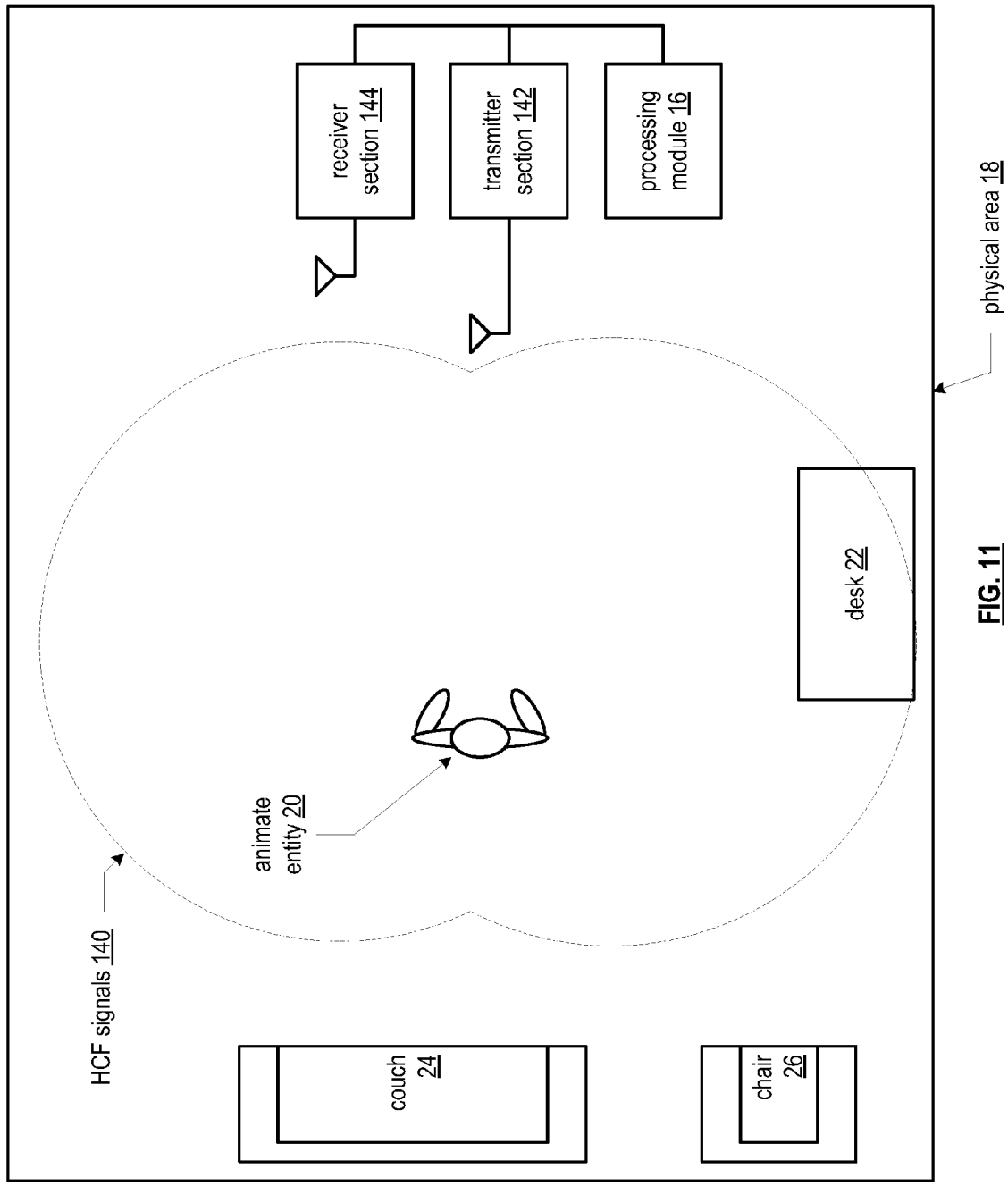
FIG. 11 is a top view diagram of another embodiment of an apparatus for determining position in accordance with the present invention.

FIG. 11 is a top view diagram of another embodiment of an apparatus for determining position that includes a transmitter section 142, a receiver section 144, and a processing module 16. The transmitter section 144, which may be similar in construct to transmitter section 12, enters a transmitter loop that begins with generating a high carrier frequency signal in accordance with a carrier frequency of a plurality of carrier frequencies (e.g., one or more frequencies within the range of a few GHz to a 100 or more GHz). In an alternate embodiment, the transmitter section may generate the high carrier frequency signal in accordance with the carrier frequency of the plurality of carrier frequencies and further in accordance with at least one of a beamforming orientation of a plurality of beamforming orientations, a polarization of a plurality of polarizations, a pulse signal pattern, and a frequency modulation pattern.

The loop continues with the transmitter section 142 transmitting the high carrier frequency signal 140. The transmitter section 142 exits the loop when a desired number of high carrier frequency signals have been generated in accordance with the plurality of carrier frequencies. When the desired number of high carrier frequency signals have not been generated in accordance with the plurality of carrier frequencies, the transmitter section 142 repeats the transmitter loop using another carrier frequency of the plurality of carrier frequencies.

The receiver section 144, which may be of a similar construct as receiver section 14, receives echo signals 35 of at least some of the desired number of high carrier frequency signals 140. The receiver section 144 then determines properties of the echo signals.

The processing module 16 determines at least one of reflection, absorption, refraction, and pass-through based on the properties. The processing module 16 then distinguishes an animate entity from an inanimate entity based on the at least one of the reflection, absorption, refraction, and pass-through. The processing module 16 then determines position of the animate entity within a given physical area.

The processing module 16 may determine the position of the animate entity determining at least one distance from the receiver section to the animate entity, determining position of the animate entity based on the at least one distance, and mapping the position to a coordinate system, wherein the coordinate system is applied to the given physical area. In addition to determining position, the processing module 16 may track motion of the animate entity by determining various positions of the animate entity within the given physical area.

Figure 12:
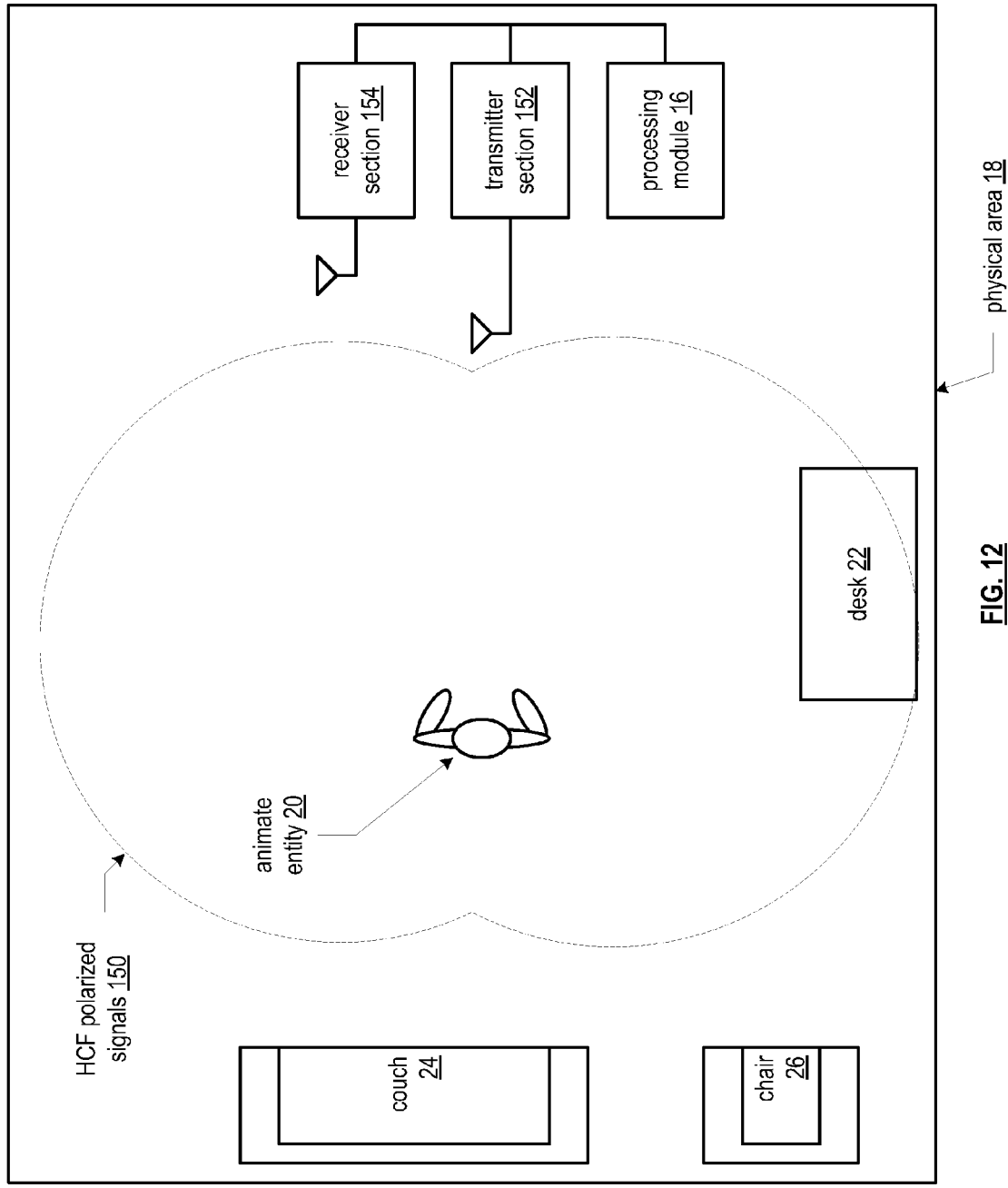
FIG. 12 is a top view diagram of another embodiment of an apparatus for determining position in accordance with the present invention.

FIG. 12 is a top view diagram of another embodiment of an apparatus for determining position that includes a transmitter section 152, a receiver section 154, and a processing module 16. The transmitter section 154, which may be similar in construct to transmitter section 12, enters a transmitter loop that begins with generating a high carrier frequency signal in accordance with a polarization of a plurality of polarizations (e.g., linear, circular, random, etc.). In an alternate embodiment, the transmitter section may generate the high carrier frequency signal in accordance with the polarization of the plurality of polarizations and further in accordance with at least one of a beamforming orientation of a plurality of beamforming orientations, a carrier frequency of a plurality of carrier frequencies, a pulse signal pattern, and a frequency modulation pattern.

The loop continues with the transmitter section 152 transmitting the high carrier frequency polarized signal 150. The transmitter section 152 exits the loop when a desired number of high carrier frequency polarized signals 150 have been generated in accordance with the plurality of polarizations. When the desired number of high carrier frequency signals has not been generated in accordance with the plurality of polarizations, the transmitter section 152 repeats the transmitter loop using another polarization of the plurality of polarizations.

The receiver section 154, which may be of a similar construct as receiver section 14, receives echo signals 35 of at least some of the desired number of high carrier frequency polarized signals 150. The receiver section 154 then determines properties of the echo signals.

The processing module 16 determines at least one of reflection, absorption, refraction, and pass-through based on the properties. The processing module 16 then distinguishes an animate entity from an inanimate entity based on the at least one of the reflection, absorption, refraction, and pass-through. The processing module 16 then determines position of the animate entity within a given physical area.

The processing module 16 may determine the position of the animate entity determining at least one distance from the receiver section to the animate entity, determining position of the animate entity based on the at least one distance, and mapping the position to a coordinate system, wherein the coordinate system is applied to the given physical area. In addition to determining position, the processing module 16 may track motion of the animate entity by determining various positions of the animate entity within the given physical area.

Figure 13:
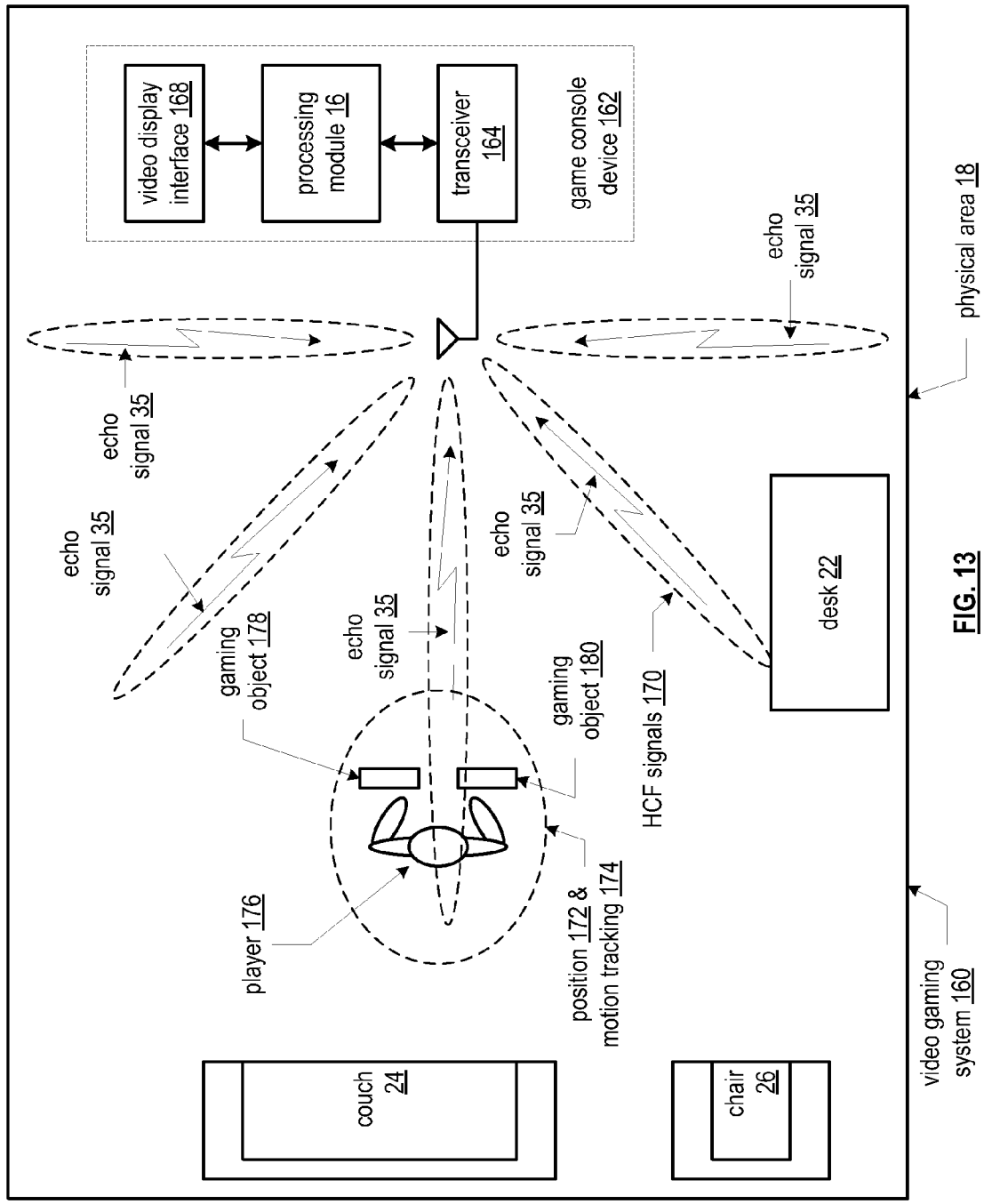
FIG. 13 is a top view diagram of an embodiment of a video game system in accordance with the present invention.

FIG. 13 is a top view diagram of an embodiment of a video game system 160 that includes a game console device 162, a video game player 176, and one or more gaming objects 178-180. The game console device 162 includes a transceiver 164 (e.g., transmitter section 12 and receiver section 14), a processing module 16, and video display interface 168. The video game system 160 is located within a physical area 18 that is a confined area such as a room, an office, etc. or an unconfined area such as a section of an airport, mall, outdoors, etc. Also located within the physical area 18 may be a plurality of inanimate objects (e.g., desk 22, couch 24, chair 26, walls, floor, ceiling, trees, etc.) and one or more animate objects 20 (e.g., one or more video game players 176).

To distinguish the animate object 20 from the inanimate objects 22-26 and to determine the position of the animate object, the transmitter section 12 enters a loop to generate a plurality of high carrier frequency signals 170 in accordance with at least one of: a carrier frequency of a plurality of carrier frequencies; a beamforming orientation of a plurality of beamforming orientations; a polarization of a plurality of polarizations; a pulse signal pattern; and a frequency modulation pattern. Examples of the various combinations of the HCF signals were described with reference to FIGS. 3-12. Within the loop, the transmitter section 12 essentially sweeps the physical area with the HCF signals 170.

The receiver section 14 receives echo signals 35 of at least some of the desired number of high carrier frequency signals 170. For example, when the transmitter section 12 transmits a HCF signal 170, the signal travels at the speed of light in a particular direction and bounces off of, passes through, and/or is absorbed by objects in the path of the signal 28. The receiver section 14, which includes one or more receivers, receives the bounce offs and/or pass-throughs as an echo signal 35. Depending on the beamforming orientation, the antenna of the receiver, and the positioning of the receiver section 14 with respect to the transmitter, an echo signal 35 may or may not be received for a given HCF signal 170.

For a received echo signal 35, the receiver section 14 determines properties of the echo signal 35. The properties include one or more of a received signal strength, a phase shift, a frequency shift, and a Doppler effect. For example, the receiver section 14 may include a received signal strength indicator, a low noise amplifier, and a down conversion module that generates a baseband signal, which includes a phase shift component and/or a frequency shift component.

The processing module 16 determines at least one of reflection, absorption, refraction, and pass-through based on the properties of the echo signals 35. Such a determination may be made based on the known properties (e.g., transmit power, beamform orientation, carrier frequency, speed of light, etc.) of the transmitted high carrier frequency (HCF) signal 170 in comparison to the properties of the received echo signal 35.

The processing module 16 continues processing by distinguishing an animate entity (e.g., person 176) from an inanimate entity (e.g., objects 22-26, walls, ceiling, floor, etc.) based on the at least one of the reflection, absorption, refraction, and pass through. For example, since animate objects (e.g., people) have a different composition than inanimate objects, high frequency signals reflect, are absorbed, refract, and/or pass through animate objects differently than are reflected, absorbed, refracted, and/or pass through inanimate objects. The difference in reflection, absorption, refraction, and/or pass through is processed to differentiate inanimate objects from animate entities.

The processing module 16 continues processing by determining position of the animate video game player 176 within a given physical area 18. For example, the processing module 16 may determine the distance between the animate video game player 176 and the receiver section 14 based on the known transmit power level of the HCF signals 170 and the received power levels of the echo signals 35. Since the signals 170 travel at the speed of light and the received power declines as the fourth power of the range, the distance between the receiver section 14 and the animate video game player 176 can be readily calculated. The processing module 16 determines the distance between each receiver and the animate video game player to obtain a plurality of distances. From the plurality of distances, the position of the animate entity with respect to the receivers can be determined. The position of the animate entity is then mapped to a coordinate system for the physical area 18 and the motion of the video game player cam be tracked.

FIGS. 14-16 are diagrams of an embodiment of a three-dimensional Cartesian coordinate system of a localized physical area that may be used for the physical area 18. In these figures an x-y-z origin is selected to be somewhere in the localized physical area and the position and motion of the player (e.g., an animate entity) and/or the gaming object is determined with respect to the origin (e.g., 0, 0, 0). For example, a point (e.g., x1, y1, z1) on the player is used to identify its position in the physical area and a point (e.g., x2, y2, z2) on the gaming object is used to identify its position in the physical area. As the player and/or gaming object move, its new position is identified within the physical area and the relation between the old point and the new point is used to determine three-dimensional motion.

FIGS. 17-19 are diagrams of an embodiment of a spherical coordinate system of a physical area. In these figures an origin is selected to be somewhere in the physical area and the position and motion of the player and/or the gaming object is determined with respect to the origin. For example, the position of the player may be represented as vector, or spherical coordinates, $(\rho, \phi, \theta)$, where $\rho \geq 0$ and is the distance from the origin to a given point P; $0 \leq \phi \leq 180°$ and is the angle between the positive z-axis and the line formed between the origin and P; and $0 \leq \theta \leq 360°$ and is the angle between the positive x-axis and the line from the origin to P projected onto the xy-plane. In general, $\phi$ is referred to as the zenith, colatitude or polar angle, $\theta$ is referred to as the azimuth. $\phi$ and $\theta$ lose significance when $\rho=0$ and $\theta$ loses significance when $\sin(\phi)=0$ (at $\phi=0$ and $\phi=180°$). A point is plotted from its spherical coordinates, by going $\rho$ units from the origin along the positive z-axis, rotate $\phi$ about the y-axis in the direction of the positive x-axis and rotate $\theta$ about the z-axis in the direction of the positive y-axis.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An apparatus comprises:
   a transmitter section coupled to enter a transmitter loop, wherein the transmitter loop includes:
      generating a plurality of high carrier frequency signals in accordance with a beamforming orientation of a plurality of beamforming orientations and further in accordance with at least one of:
         a carrier frequency of a plurality of carrier frequencies;
         a polarization of a plurality of polarizations;
         a pulse signal pattern; and
         a frequency modulation pattern;
      transmitting the plurality of high carrier frequency signals to produce a high carrier frequency beamformed signal; and
      looping through each beamforming orientation of the plurality of beamforming orientations at a particular at least one of the carrier frequencies, the plurality of polarizations, the pulse signal pattern, and the frequency modulation pattern to generate respective high carrier frequency beamformed signals until a desired number of at least one of the carrier frequencies, the plurality of polarizations, the pulse signal pattern, and the frequency modulation pattern have been utilized in the transmitter loop for each beamforming orientation, wherein the desired number is greater than one, in order to loop through a plurality of respective at least one of the plurality of carrier frequencies, the plurality of polarizations, the pulse signal pattern, and the frequency modulation pattern for each beamforming orientation;
   a receiver section coupled to:
      receive echo signals of at least some of the desired number of high carrier frequency beamformed signals; and
      determine properties of the echo signals; and
   a processing module coupled to:
      determine at least one of reflection, absorption, refraction, and pass through based on the properties;
      distinguish an animate entity from an inanimate entity based on the at least one of the reflection, absorption, refraction, and pass through; and
      determine position of the animate entity within a given physical area.

2. The apparatus of claim 1, wherein the properties comprises at least one of:
   received signal strength;
   phase shift;
   frequency shift; and
   Doppler effect.

3. The apparatus of claim 1, wherein the transmitter section comprises at least one of:
   a baseband beamforming section coupled to generate a plurality of beamforming coefficients; and
   a radio frequency (RF) beamforming section coupled to generate a plurality of phase offsets, wherein the plurality of beamforming orientations includes at least one of the plurality of beamforming coefficients and the plurality of phase offsets.

4. The apparatus of claim 1, wherein the determining the position of the animate entity within the given physical area comprises:
   determining at least one distance from the receiver section to the animate entity;
   determining position of the animate entity based on the at least one distance; and
   mapping the position to a coordinate system, wherein the coordinate system is applied to the given physical area.

5. The apparatus of claim 1, wherein the processing module further functions to:
   track motion of the animate entity by determining various positions of the animate entity within the given physical area.

6. The apparatus of claim 1, wherein the receiver section comprises:
   a plurality of receivers, wherein at least two of the plurality of receivers are distributed within the given physical area.

7. An apparatus comprises:
   a transmitter section coupled to enter a transmitter loop, wherein the transmitter loop includes:

generating a high carrier frequency signal in accordance with a carrier frequency of a plurality of carrier frequencies and further in accordance with at least one of:
- a beamforming orientation of a plurality of beamforming orientations;
- a polarization of a plurality of polarizations;
- a pulse signal pattern; and
- a frequency modulation pattern;

transmitting the high carrier frequency signal; and looping through each carrier frequency of the plurality of carrier frequencies at a particular at least one of the plurality of beamforming orientations, the plurality of polarizations, the pulse signal pattern, and the frequency modulation pattern to generate respective high carrier frequency signals until a desired number of at least one of the plurality of beamforming orientations, the plurality of polarizations, the pulse signal pattern, and the frequency modulation pattern have been utilized in the transmitter loop for each beamforming orientation, wherein the desired number is greater than one, in order to loop through a plurality of respective at least one of the plurality of carrier frequencies, the plurality of polarizations, the pulse signal pattern, and the frequency modulation pattern for each beamforming orientation;

a receiver section coupled to:
- receive echo signals of at least some of the desired number of high carrier frequency signals; and
- determine properties of the echo signals; and a processing module coupled to:
- determine at least one of reflection, absorption, refraction, and pass through based on the properties;
- distinguish an animate entity from an inanimate entity based on the at least one of the reflection, absorption, refraction, and pass through; and
- determine position of the animate entity within a given physical area.

8. The apparatus of claim 7, wherein the determining the position of the animate entity within the given physical area comprises:
- determining at least one distance from the receiver section to the animate entity;
- determining position of the animate entity based on the at least one distance; and
- mapping the position to a coordinate system, wherein the coordinate system is applied to the given physical area.

9. The apparatus of claim 7, wherein the processing module further functions to:
- track motion of the animate entity by determining various positions of the animate entity within the given physical area.

10. The apparatus of claim 7, wherein the receiver section comprises:
- a plurality of receivers, wherein at least two of the plurality of receivers are distributed within the given physical area.

11. An apparatus comprises:
- a transmitter section coupled to enter a transmitter loop, wherein the transmitter loop includes:
  - generating a plurality of high carrier frequency signals in accordance with a polarization of a plurality of polarizations and further in accordance with at least one of:
    - a beamforming orientation of a plurality of beamforming orientations;
    - a carrier frequency of a plurality of carrier frequencies;
    - a pulse signal pattern; and
    - a frequency modulation pattern;
  - transmitting the plurality of high carrier frequency signals to produce a high carrier frequency polarized signal; and
  - looping through each polarization of the plurality of polarizations at a particular at least one of the plurality of beamforming orientations, the plurality of carrier frequencies, the pulse signal pattern, and the frequency modulation pattern to generate respective high carrier frequency polarized signals until a desired number of at least one of the plurality of beamforming orientations, the plurality of carrier frequencies, the pulse signal pattern, and the frequency modulation pattern have been utilized in the transmitter loop for each beamforming orientation, wherein the desired number is greater than one, in order to loop through a plurality of respective at least one of the plurality of carrier frequencies, the plurality of polarizations, the pulse signal pattern, and the frequency modulation pattern for each beamforming orientation;

a receiver section coupled to:
- receive echo signals of at least some of the desired number of high carrier frequency polarized signals; and
- determine properties of the echo signals; and a processing module coupled to:
- determine at least one of reflection, absorption, refraction, and pass through based on the properties;
- distinguish an animate entity from an inanimate entity based on the at least one of the reflection, absorption, refraction, and pass through; and
- determine position of the animate entity within a given physical area based on the at least one of the reflection, absorption, refraction, and pass through.

12. The apparatus of claim 11, wherein the determining the position of the animate entity within the given physical area comprises:
- determining at least one distance from the receiver section to the animate entity;
- determining position of the animate entity based on the at least one distance; and
- mapping the position to a coordinate system, wherein the coordinate system is applied to the given physical area.

13. The apparatus of claim 11, wherein the processing module further functions to:
- track motion of the animate entity by determining various positions of the animate entity within the given physical area.

14. The apparatus of claim 11, wherein the receiver section comprises:
- a plurality of receivers, wherein at least two of the plurality of receivers are distributed within the given physical area.

* * * * *